United States Patent [19]

Hiraiwa

[11] Patent Number: 4,635,744
[45] Date of Patent: Jan. 13, 1987

[54] FOUR-WHEEL DRIVE AUTOMOTIVE VEHICLE

[75] Inventor: Kazuyoshi Hiraiwa, Atsugi, Japan

[73] Assignee: Nissan Motor Company, Limited, Japan

[21] Appl. No.: 590,490

[22] Filed: Mar. 16, 1984

[51] Int. Cl.⁴ .............................................. B60K 5/04
[52] U.S. Cl. ...................................... 180/249; 180/247
[58] Field of Search ............... 180/247, 248, 249, 233; 74/710.5, 714, 740, 745, 665 R

[56] References Cited

U.S. PATENT DOCUMENTS

| | | | |
|---|---|---|---|
| 2,107,072 | 2/1938 | Herrington | 74/342 |
| 2,853,890 | 9/1958 | Kelbel | 74/761 |
| 3,548,630 | 12/1970 | Crooks | 74/682 |
| 3,993,152 | 11/1976 | Fogelberg | 180/44 R |
| 3,999,447 | 12/1976 | Halberg | 74/701 |
| 4,040,309 | 8/1977 | Wood et al. | 74/665 T |
| 4,215,593 | 8/1980 | Shono et al. | 74/665 D |
| 4,476,953 | 10/1984 | Hiraiwa | 180/247 |

FOREIGN PATENT DOCUMENTS

| | | | |
|---|---|---|---|
| 55-11948 | 1/1980 | Japan | 180/247 |
| 55-17727 | 7/1980 | Japan | 180/247 |
| 30834 | 2/1983 | Japan | 180/247 |

*Primary Examiner*—Henry Bennett
*Attorney, Agent, or Firm*—Lane and Aitken

[57] ABSTRACT

A four-wheel drive automotive vehicle comprises an engine having a crank shaft extending in a transverse direction of a vehicle body, a transmission having a speed change mechanism between an input shaft and an output shaft arranged so as to extend in a transverse direction of the vehicle body within a transaxle case, a final reduction gear arranged substantially in a coaxial relationship to either a front shaft or a rear shaft within the transaxle case and driven by the output shaft of the transmission, a differential device for front and rear wheels, having a pair of side gears arranged substantially in a coaxial relationship to either the front shaft or the rear shaft and at least two pinion gears driven by the final reduction gear and provided within the housing connected to the transaxle case, the pinion gears engaging the side gears, a differential device for either the front shaft or the rear shaft having at least two pinion gears connected to one of the pair of side gears of the differential device for the front and rear wheels and a pair of side gears engaging the pinion gears and joined to either the front shaft or the rear shaft, a first transfer gear for rotating together with the other side gear of the differential device for changing a rotation direction of drive power of the first transfer gear into a different direction at a right angle thereby to drive the differential device for the wheels at the other shaft.

9 Claims, 2 Drawing Figures

FOUR-WHEEL DRIVE AUTOMOTIVE VEHICLE

BACKGROUND OF THE INVENTION

This invention relates to a four-wheel drive automotive vehicle having a transversely arranged engine.

In general, it is desired that a four-wheel drive automotive vehicle is equipped with a so called center differential device for allowing relative rotation between its front and rear wheels so as to obtain always the four-wheel drive and with a so called high-to-low speed change device so as to obtain a large torque.

In the conventional two-wheel drive vehicles having a transversely arranged engine, as shown in Japanese Patent Laying Open Nos. 55-11948 and 55-17727, the above-mentioned center differential device and the speed change device are not provided. Therefore, if a four-wheel drive automotive vehicle includes a transaxle in which a transmission for a two-wheel automotive vehicle and a final reduction gear are integrally arranged, the center differential device and the low-to-high speed change device cannot be easily provided therein, or its construction must be largely modified.

Accordingly, if a conventional four-wheel drive automotive vehicle is equipped with a transaxle for a two-wheel automotive vehicle, the performance is decreased because of non presence of the center differential device and the high-to-low speed change device. Also, even if they are provided, then the construction must be modified so as to result in a cost increase and a large drive mechanism.

OBJECT OF THE INVENTION

The object of the invention is to eliminate the defects of the prior art devices as above-mentioned.

DETAILED DESCRIPTION OF THE PREFERRED EMBODIMENTS

Figure 1:
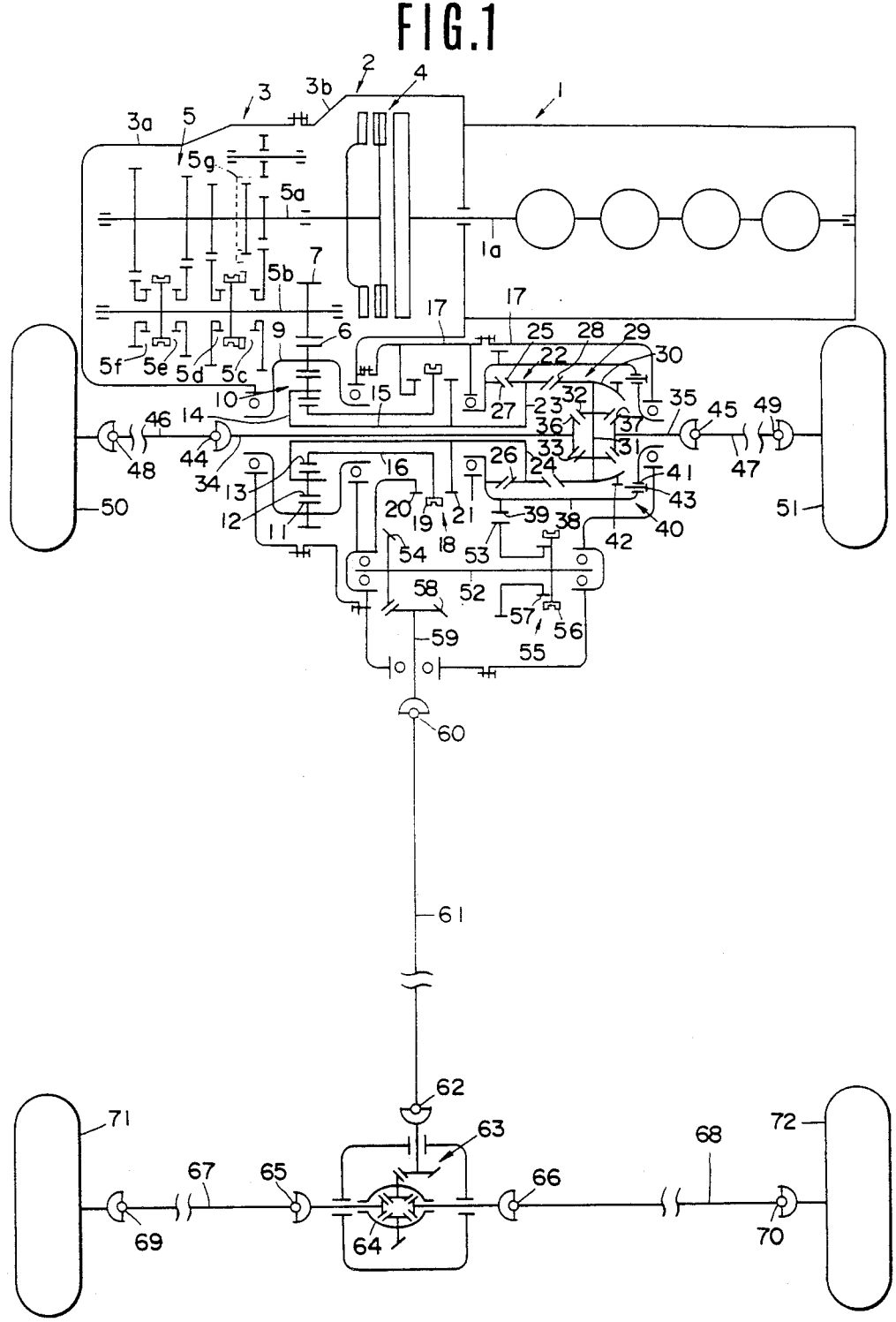
FIG. 1 is a diagrammatic view showing a power train for a four-wheel drive automotive vehicle according to an embodiment of this invention.
Figure 2:
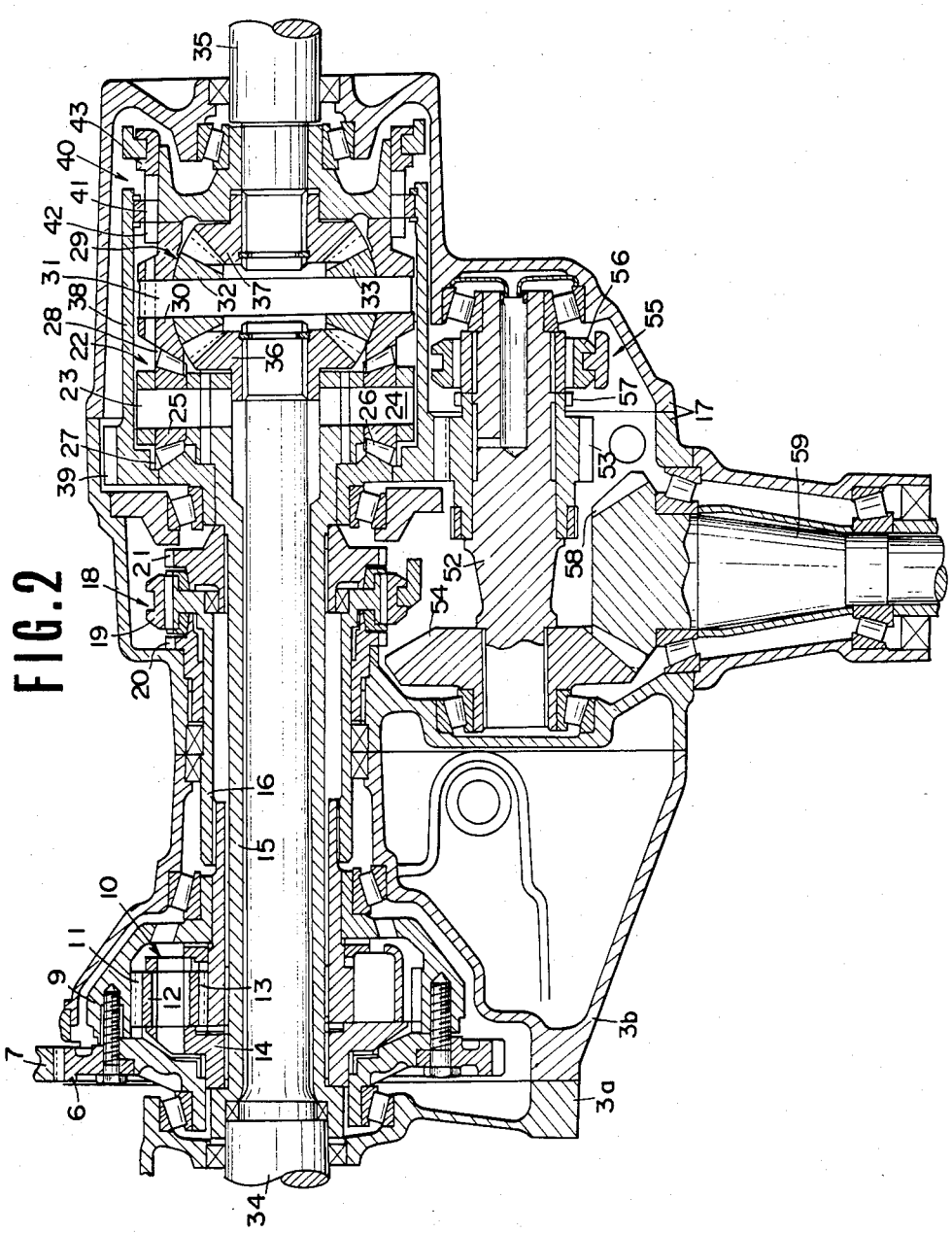
FIG. 2 is a sectional view showing an essential portion of the embodiment of FIG. 1.

The reference numeral 1 denotes a transversely arranged engine in which a crank shaft 1a extends transversely in a vehicle body as an output shaft at a front portion of a vehicle. The reference numeral 2 denotes a manually operated transaxle which includes a transaxle case 3, a clutch 4 in the transaxle case 3, a transmission 5 connected in series to the engine 1, and a final reduction gear 6. The transmission 5 includes an input shaft 5a and an output shaft 5b. The input shaft 5a is connected in series to the crank shaft 1a of the engine 1 through the clutch 4 and arranged transversely in the vehicle body. The output shaft 5b is arranged transversely in the vehicle body in parallel to the input shaft 5a.

Provided between the input shaft 5a and the output shaft 5b is a speed change gear as a speed change mechanism which includes a first speed gear 5c, a second speed gear 5d, a third speed gear 5e, a fourth speed gear 5f and a reverse gear 5g. A drive gear 7 is placed at an end of the output gear 5b and engages the final reduction gear 6. This final reduction gear 6 is rotatable about a shaft extending in the transaxle case 3 in the transverse direction of the vehicle body. The final reduction gear 6 and a front shaft 34 are coaxial. The final reduction gear 6 is attached to a casing 9 which is rotatably supported by the transaxle case 3 in such a manner that it can rotate together with the final reduction gear 6.

Arranged in the casing 9 is a planetary gear as a high-to-low speed change gear mechanism 10 which includes a ring gear 11 integrally formed with the casing 9 inside thereof, a plurality of planetary gears 12 engaging the ring gear 11, and a sun gear 13 meshing with the planetary gears 12. The planetary gears 12 are joined to a carrier 14 which is splined to a first hollow shaft 15. The front shaft 34 is inserted in the hollow shaft 15. The sun gear 13 is splined to a second hollow shaft 16 in which the first hollow shaft 15 is inserted.

A portion 3a of the transaxle case 3 is positioned at the transmission 5 while a portion 3b thereof is at the clutch 4. The portions 3a, 3b are joined to each other near a plane including the final reduction gear 6. A housing 17 is attached to the portion 3b of the transaxle 3 and houses therein the first and second hollow shafts 15, 16 protruding from the transaxle case 3.

Placed in the housing 17 is means 18 for controlling or operating the high-to-low speed change gear mechanism 10. The operating means 18 includes a coupling sleeve 19 slidable on a spline formed at an end portion of the second hollow shaft 16, clutch teeth 20 fixed to the housing 17 and adapted to engage the coupling sleeve 19.

A differential device 22 for the front and rear wheels is provided in the housing 17 and includes two shafts 23,24 joined to one end of the first hollow shaft 15 and crossing the first hollow shaft 15, a pair of pinion gear 25,26 rotatably arranged about the shafts 23,24, respectively, and a pair of side gears 27,28 engaging the pinion gears 25,26 and arranged coaxially with the front shaft 34.

A differential device 29 for the front wheels is formed integral with the differential device 22 for the front and rear wheels within the housing 17. The differential device 29 for the front wheels includes a shaft 31 crossing a shaft extending transversely in the vehicle body within the housing 30 formed integral with the side gear 28 of the differential device 22 for the front and rear wheels, a pair of pinion gears 32,33 rotatable about the shaft 31, a pair of side gears 36,37 joined to the front shafts 34,35 and engaging the pinion gears 32,33. The differential device 29 for the front wheels. Both ends of the casing 38 are supported by the housing 17. A first transfer gear 39 is provided at a peripheral portion of the casing 38.

A lock-up mechanism 40 for locking up the differential device 22 for the front and rear wheels includes clutch teeth 41 placed at the casing 38 of the differential device 22 for the front and rear wheels, clutch teeth 42 placed at the housing 30 of the differential device 29 for the front wheels, and a pin 43 for connecting the casing 38 with the housing 30 when both clutch teeth 41 are engaged. The side gears 36, 37 of the differential device 29 for the front wheels are splined to the front shafts 34,35, respectively. The front shaft 34,35 are connected by way of constant velocity joints 44,45, drive shafts 46,47 and constant velocity joints 48,49 to a pair of front wheels 50,51, respectively. An intermediate shaft 52 is arranged transversely in the housing 17 and rotatably supported by the housing 17. A second transfer gear 53 engaging the first transfer gear 39 is rotatable about the intermediate shaft 52. A first bevel gear 54 is splined to the intermediate shaft 52 so as to rotate together with it.

The reference numeral 55 denotes a mechanism for changing a two-wheel drive to a four-wheel drive, which includes a coupling sleeve 56 slidable on a spline formed at the intermediate shaft 52, and clutch teeth 57 placed at the second transfer gear 53 and adapted to engage the coupling sleeve 56. A second bevel gear 58 engages the first bevel gear 54 and is provided at a shaft 59 extending in the longitudinal direction of the vehicle body. These first and second bevel gears constitute a rotation direction change gear device.

The shaft 59 protrudes from the housing 17 outwardly and is connected by way of a universal joint 60, a propeller shaft 61 and a universal joint 62 to a final reduction gear 64 for the rear wheels which has therein the differential device 64 for the rear wheels. The differential device 64 for the rear wheels is connected by way of constant velocity joints 65,66, a pair of rear shafts 67,68 and constant velocity joints 69,70 to a pair of rear wheels 71,72.

The operation of the above embodiment will be explained.

The drive power from the engine 1 is transferred by way of the clutch 4 to the input shaft 5A of the transmission 5. After speed-changed by the speed change device, the drive power is output from the output shaft 5B and rotates the final reduction gear 6 through the drive gear 7. The rotation of the final reduction gear 6 is transferred to the casing 9 and then to the high-to-low speed change gear mechanism 10. If the high-to-low speed change control device 18 is operated in a low speed position, the coupling sleeve 19 engages the clutch 20 at the housing 17 in such a manner that the sun gear 13 is fixed. Accordingly, the rotation of the ring gear 11 is decreased and transferred to the carrier 14. The rotation is further transferred by way of the first hollow shaft 15 to the differential device 22 for the front and rear wheels. Thereafter, the rotation is divided and transmitted to the first transfer gear 39 and the differential device 29 for the front wheels by means of the differential gear mechanism of the side gears 28,28 and the pinion gears 25,26. The rotation of the side gear 28 is transferred to the housing 30 of the differential device 29 for the front wheels. The rotation of the housing 30 is divided and transmitted to the case of the front shaft 34,35 by means of the differential gear mechanism of the side gears 36,37 and the pinion gears 32,33, and then drives the front wheels 50,51 through the constant velocity joints 44,45, the drive shafts 46,47 and the constant velocity joints 48,49. The rotation of the other side gear 27 is transferred to the casing 38 and further transferred by way of the first transfer gear 39 to the second transfer gear 53.

If the two-wheel drive to four-wheel drive change mechanism 55 is changed into the four-wheel drive, the coupling sleeve 56 engages the clutch 57 so that the rotation of the second transfer gear 53 is transferred to the intermediate shaft 52. The rotation direction of the intermediate shaft 52 is changed by means of the first and second bevel gears 54,58 so that the rotation is transferred to the shaft 59 extending in the longitudinal direction of the vehicle body. The rotation of the shaft 59 is transferred by way of the universal joint 60, the propeller shaft 61 and the universal joint 62 to the final reduction gear 63 for the rear wheels. The rotation direction is changed by the final reduction gear 63 for the rear wheels and the rotation speed is reduced at the same gear ratio as the front wheels. The rotation is further divided at the differential device 64 for the rear wheels and drives the rear wheels, 71,72 through the constant velocity joints 65,66, the rear shafts 67,68 and the constant velocity joints 69,70. As a result, the front wheels 50,51 and the rear wheels 71,72 are driven so that a four-wheel drive can be obtained.

The differential device 22 for the front and rear wheels divides and transmits the drive power to the front wheels 50,51 and the rear wheels 71,72 in such a way that the rotation speed differences between the front and rear wheels 50, 51, 71, 72 can be absorbed when a vehicle turns or if the diameters of wheels are different. This permits an excellent four-wheel drive regardless of road conditions.

If the speed change control or operation device 18 is changed into a high speed mode, the coupling sleeve 19 engages the clutch teeth 21 of the first follow shaft 15. The sun gear 13 is joined to the carrier 14 so that the ring gear 11, the planetary gears 12, and the sun gear 13 together rotate. The rotation of the final reduction gear 6 is directly transferred to the differential device 22 for the front and rear wheels without any reduction at the high-to-low speed change gear mechanism 10. The same four-wheel drive can be obtained.

If the lock-up mechanism is set in a locking-up condition, the pin 43 engages the clutch teeth 41 of the casing 38 for the differential device 22 and the clutch teeth 42 of the housing 30 for the differential device 29 so that the casing 38 and the housing 30 are joined to each other. The differential device 22 for the front and rear wheels stops to divide the drive power. As a result, the front and rear wheels 50, 51, 71, 72 together rotate.

If in the locking condition of the lock-up mechanism the coupling sleeve 56 of the two-wheel drive to four-wheel drive change device 55 is disengaged from the clutch teeth 57 of the second transfer gear 53 so as to become in a two-wheel drive, the second transfer gear 53 freely rotates about the intermediate shaft 52 so that the drive power from the engine 1 is not transferred to the intermediate shaft. The drive power from the engine 1 is transferred only to the front wheels 50,51 so as to become in a two-wheel drive.

Although in the above-mentioned embodiment there has been explained a front engine type of four-wheel drive automotive vehicle in which an engine is placed at a front portion of the vehicle, this invention can be applied a rear engine type of four-wheel drive automotive vehicle and other type four-wheel drive automotive vehicles in which an engine is provided at a rear portion of the vehicle. Also, according to this invention, an automatic transmission can be used in place of a manually operated speed change mechanism as above-mentioned.

According to this invention, a transaxle for a transversely arranged entine type two-wheel drive automotive vehicle can be easily modified only at a final reduction gear portion thereof so as to obtain a transaxle for a four-wheel drive automotive vehicle equipped with a differential device for the front and rear wheels and a high-to-low speed change device, with a housing being added. Therefore, according to this invention, a transaxle for a two-wheel drive vehicle and a four-wheel drive vehicle equipped with a differential device for the front and rear wheels and a high-to-low speed change device can be used only by minor modifying. Accordingly, the production cost of a four-wheel drive vehicle can be decreased. A differential device for the front and rear wheels can be integrally formed with a differential device for the front wheels or a differential device for the rear wheels. In this respect, a drive mechanism can be formed in a small size.

I claim:

1. A four-wheel drive automotive vehicle comprising:
   a front shaft for driving front wheels having first and second divided portions, said first portion of the front shaft driving one of the front wheels and said second portion of the front shaft driving the other front wheel;
   a rear shaft for driving rear wheels having first and second divided portions, said first portion of the rear shaft driving one of the rear wheels and said second portion of the rear shaft driving the other rear wheel;
   an engine having a crank shaft rotatable about an axis extending in a transverse direction of a vehicle body;
   a transmission having a speed change mechanism between an input shaft and a first output shaft each rotatable about an axis extending in a transverse direction of the vehicle body and arranged in parallel with each other, said input shaft driven by said crank shaft;
   a final reduction gear driven by said first output shaft and having a second output shaft arranged substantially in a coaxial relationship to one of said front and rear shafts;
   a first differential device having at least first and second pinion gears each rotatably supported by a first shaft which extends at a right angle to said one of the front and rear shafts and is driven by said second output shaft to rotate about an axis of rotation of said second output shaft, said first differential device having first and second side gears arranged substantially in a coaxial relationship to said one of the front and rear shafts and facing each other, said first and second pinion gears each positioned between said first and second side gears and each meshing with said first and second side gears in such a manner that the first and second side gears are rotatable at different speeds;
   a second differential device having at least third and fourth pinion gears each rotatably supported by a second shaft which extends at a right angle to said one of the front and rear shafts and is driven by said first side gear, said second differential device having third and fourth side gears, said third side gear rotatable about an axis of rotation of said one of the front and rear shafts and driving said first portion of said one of the front and rear shafts, said fourth side gear rotatable about the axis of rotation of said one of the front and rear shafts and driving said second portion of said one of the front and rear shafts, said third and fourth pinion gears each positioned between said third and fourth side gears and meshing with said third and fourth side gears in such a manner that the third and fourth side gears are rotatable at different speeds;
   a first transfer gear which rotates together with said second side gear of the first differential device about an axis of rotation of said second side gear;
   a direction change gear device for changing a rotation direction of drive power of the first transfer gear into a different direction at a right angle thereto thereby to drive a third differential device for driving said first and second portions of the other one of the front and rear shafts, said first and second portions of said other one of the front and rear shafts being rotatable at different speeds.

2. A four-wheel drive automotive vehicle as defined in claim 1, wherein the transmission connected in series to the engine and the final reduction gear are enclosed in a main transaxle case and wherein a clutch is provided in the transaxle case between the crank shaft and the input shaft of the transmission.

3. A four-wheel drive automotive vehicle as defined in claim 1, wherein the speed change mechanism is a speed change gear including a first speed gear, a second speed gear, a third speed gear, a fourth speed gear and a reverse speed gear.

4. A four-wheel drive automotive vehicle as defined in claim 1, further comprising a high-to-low speed change gear mechanism and means for operating said high-to-low speed change gear mechanism, said high-to-low speed change gear mechanism including a casing coaxially rotatable with the final reduction gear about the axis of rotation of said second output shaft of the final reduction gear, a ring gear integrally formed with the casing, a plurality of planetary gears engaging the ring gear and a sun gear meshing with the planetary gears which are joined to a carrier splined to said second output shaft of the final reduction gear, said second output shaft being hollow to define a cavity in which said one of the front and rear shafts is inserted, said means for operating said high-to-low speed change mechanism fixing the sun gear with respect to the planetary pinion carrier so as to obtain a high speed mode and preventing the sun gear from moving so as to obtain a low speed mode, selectively.

5. A four-wheel drive automotive vehicle as defined in claim 4, wherein the first differential device is fixed to one end of the second output shaft.

6. A four-wheel drive automotive vehicle as defined in claim 1, wherein the first and second differential devices are integrally formed.

7. A four-wheel drive vehicle as defined in claim 1, further comprising a lock-up mechanism for locking up the first differential device.

8. A four-wheel drive automotive vehicle as defined in claim 7, wherein the lock-up mechanism includes a pin for fixing said second side gear of the first differential device with respect to said first side gear of the first differential device so that said first and second side gears rotate at the same speed.

9. A four-wheel drive automotive vehicle as defined in claim 1, comprising a mechanism for changing a two-wheel drive to a four-wheel drive.

* * * * *